United States Patent
Rossetti et al.

(10) Patent No.: US 12,556,515 B2
(45) Date of Patent: Feb. 17, 2026

(54) GATEWAY SERVICE FOR APPLICATION PROGRAMMING INTERFACE IN EDGE DEVICE

(71) Applicant: RED HAT, INC., Raleigh, NC (US)

(72) Inventors: Leonardo Rossetti, Sao Paulo (BR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 426 days.

(21) Appl. No.: 18/212,340

(22) Filed: Jun. 21, 2023

(65) Prior Publication Data

US 2024/0430238 A1    Dec. 26, 2024

(51) Int. Cl.
*G06F 9/54* (2006.01)
*H04L 9/40* (2022.01)

(52) U.S. Cl.
CPC .......... *H04L 63/0281* (2013.01); *G06F 9/547* (2013.01); *H04L 63/0884* (2013.01)

(58) Field of Classification Search
CPC .. H04L 63/0281; H04L 63/0884; G06F 9/547
USPC .......................................................... 726/6
See application file for complete search history.

(56) References Cited

U.S. PATENT DOCUMENTS

| | | | | |
|---|---|---|---|---|
| 9,798,522 | B2* | 10/2017 | Strachota | G06F 8/30 |
| 11,032,160 | B1* | 6/2021 | Raheja | H04L 41/0843 |
| 11,748,686 | B1* | 9/2023 | Kwan | G06F 11/3684 |
| | | | | 705/7.27 |
| 11,917,013 | B1* | 2/2024 | Han | H04L 12/66 |
| 12,095,794 | B1* | 9/2024 | Karaje | H04L 67/306 |
| 2015/0169386 | A1* | 6/2015 | Gopalraj | G06F 8/71 |
| | | | | 719/328 |
| 2017/0185791 | A1* | 6/2017 | Yamada | G06F 21/52 |
| 2019/0230169 | A1* | 7/2019 | Elangovan | H04L 63/08 |
| 2023/0152598 | A1* | 5/2023 | Brebner | G02B 27/0977 |
| | | | | 359/627 |
| 2023/0251948 | A1* | 8/2023 | Sriperambudur | G06F 11/3075 |
| | | | | 718/100 |
| 2023/0385139 | A1* | 11/2023 | Cox | H04L 63/0884 |
| 2023/0412570 | A1* | 12/2023 | Holm | H04L 67/133 |
| 2024/0069995 | A1* | 2/2024 | Praharaj | G06F 9/547 |
| 2024/0372895 | A1* | 11/2024 | Rajagopalan | G06F 21/604 |

OTHER PUBLICATIONS

Xu et al., "Microservice Security Agent Based On API Gateway In Edge Computing", https://www.ncbi.nlm.nih.gov/pmc/articles/PMC6891515/, Nov. 19, 2019; pp. 1-23.
"EdgeX Foundry Documentation", https://docs.edgexfoundry.org/1.3/microservices/security/Ch-APIGateway, 2020; pp. 1-9.

* cited by examiner

Primary Examiner — Thanh T Le
(74) Attorney, Agent, or Firm — Kilpatrick Townsend & Stockton LLP

(57) ABSTRACT

A gateway service can be generated by a daemon to facilitate communication for application programming interfaces (APIs) in edge devices. For example, the daemon can monitor a database including one or more configuration files for an API. The daemon can detect an update to a configuration file of the one or more configuration files in the database. In response to detecting the update to the configuration file, the daemon can generate an instance of the gateway service configured to interface between a software application and the API.

20 Claims, 4 Drawing Sheets

GATEWAY SERVICE FOR APPLICATION PROGRAMMING INTERFACE IN EDGE DEVICE

TECHNICAL FIELD

The present disclosure relates generally to edge computing. More specifically, but not by way of limitation, this disclosure relates to a gateway service for an application programming interfaces (API) in an edge device.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge-computing solutions. Edge computing is a networking philosophy focused on bringing computing power and data storage as close to the source of the data as possible to reduce latency and bandwidth usage. Edge computing solutions involve executing services on nodes (e.g., servers or virtual machines) positioned at physical edges of a computing environment that are geographically close to corresponding client devices, to reduce latency and improve a perceived quality of the services.

DETAILED DESCRIPTION

Figure 1:
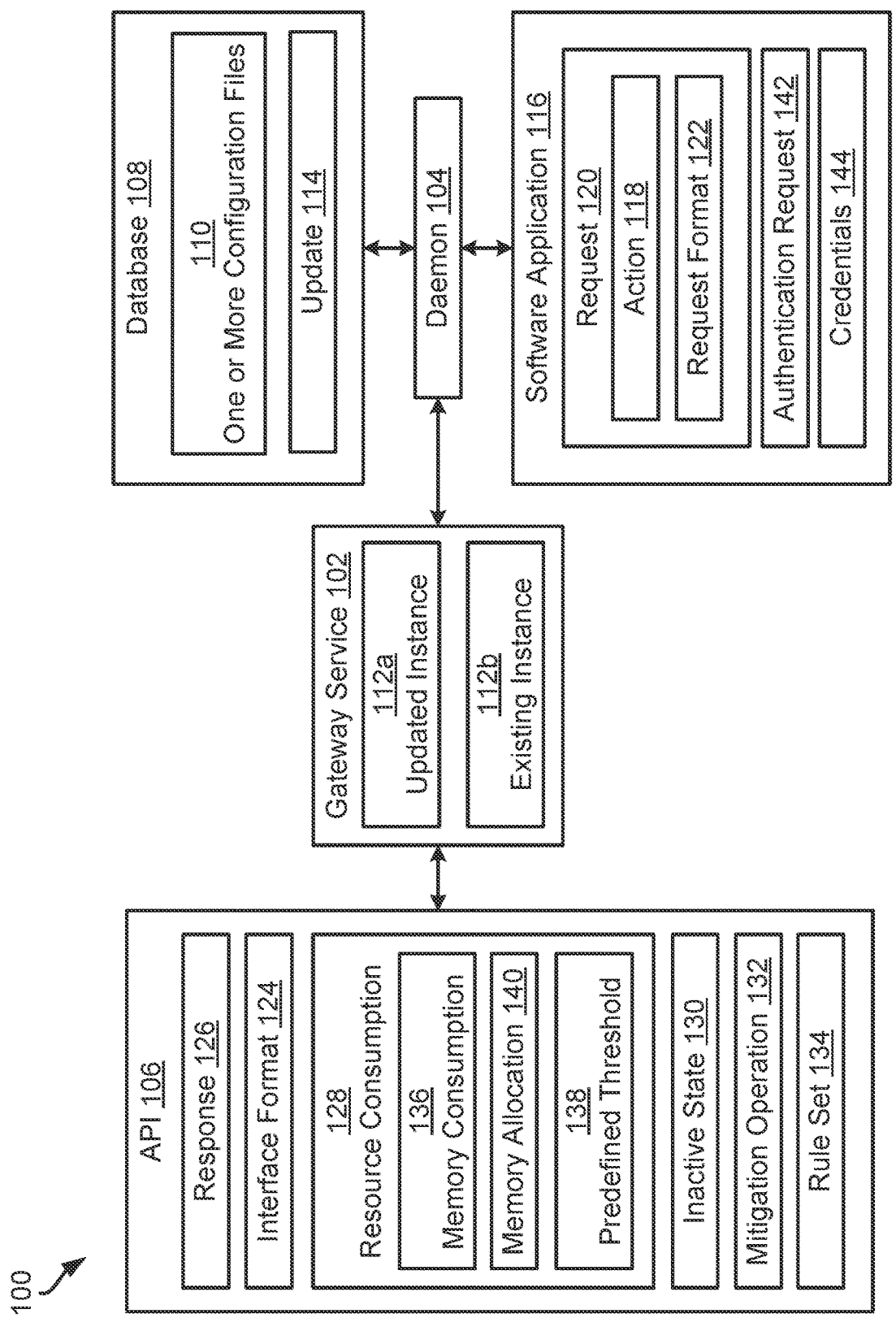
FIG. 1 is a block diagram of an example of an edge computing environment including a gateway service generated by a daemon for an application programming interface (API) according to one example of the present disclosure.

Applications in edge devices may require implementing hardware-specific integrations such as low-level hardware application-programming interface (API) calls. Edge devices typically share common functionalities per industry (e.g., in the automotive industry: turning on a car's camera, turning a wheel, identifying an acceleration of a car, heating a car set). In some examples, edge devices or hardware components in a particular industry may each implement a different hardware API. Such variety in hardware APIs can cause difficulties for software applications interacting with each different hardware API. For instance, each hardware API may implement a respective communication protocol that can be used to interact with the hardware API and may differ from other communication protocols used for other hardware APIs. As a result, the software application may perform checks for each hardware API to identify a respective communication protocol and generate a request for the hardware API that follows the respective communication protocol. Performing these checks can contribute to latency of the software application interfacing with the hardware API, particularly if the edge device is a resource-constrained device (e.g., a device with limited computing resources such as processing power and memory).

Additionally, it may not be useful to use conventional API gateway services to coordinate use of the different hardware APIs, as such gateway services were created for a cloud-based architecture in which resources are comparatively limitless. Further, APIs in cloud-based computing environments may typically use a hypertext transfer protocol (HTTP) or representational state transfer (ReST). The hardware APIs may use various communication protocols in addition to HTTP and ReST, which can reduce compatibility of the conventional gateway services with the hardware APIs in edge devices. Unlike typical cloud-based computing environments, the software application in the edge device may have functional safety standards that can impose regulations associated with the hardware APIs. The variety of hardware APIs that the software application can interact with may complicate how the software application is built to meet the functional safety standards.

Some examples of the present disclosure can overcome one or more of the issues mentioned above by using an API daemon that can automatically scale API gateway services to enable a software application to communicate with different hardware APIs. The different hardware APIs can communicate with hardware to perform an action based on a request generated by the software application. Instead of implementing a different integration for each hardware API, the software application can use a gateway service generated by the API daemon to translate the request of the software application such that a respective hardware API can interpret the request. Thus, the gateway service can standardize how the software application interacts with the hardware API to avoid requiring the software application to implement a specific integration based on each different hardware API. This standardization can improve latency associated with the software application by simplifying how the software application may interface with the different hardware APIs.

Specifically, instead of having the software application determine a suitable communication format to interact with the hardware API, the gateway service can transform the request of the software program to the suitable communication format. For example, the gateway service can translate a request format of the request generated by the software application to follow an interface format of the hardware API. In examples in which the software application interacts with more than one hardware API, a respective gateway service can be generated for each hardware API such that the respective gateway service can perform a suitable translation for the corresponding hardware API. Thus, a suitable gateway service can be provided to accommodate any communication protocol used by the hardware APIs, rather than solely HTTP or ReST, for example.

With this standardization, the software application can avoid performing checks associated with each different API, thereby improving latency associated with communication between the software application and the API. Additionally, the gateway service can simplify code by removing code associated with a respective integration of the software application for each different API. A one-to-one relationship between the gateway service and the API can ensure a minimum level of process isolation for each API in the edge computing environment, facilitating certification with respect to the functional safety standards.

In one particular example, a daemon in an edge device can monitor a database that stores one or more configuration files. The daemon can be a single computer program that can run as a background process of the edge device to monitor the database for updates to the configuration files. The configuration files can include service definitions in a human-readable text file format (e.g., Yet Another Markup Language (YAML)). The daemon can use the configuration files in the database to generate an instance of a gateway service to interface between a software application and an API of the edge device. For example, the daemon can read the configuration file to use the service definitions of the configuration file to configure settings of the instance of the gateway service.

The gateway service can extend the API by adding a layer in front of the API while leaving the API unchanged. By extending the API, the gateway service can provide one or more capabilities with respect to the API. For example, the gateway service can expose an interface for a different communication protocol than a communication protocol used by the API. The gateway service can receive a request from the software application that uses the different communication protocol and can then translate the request to follow the communication protocol of the API. In some examples, the gateway service may use a data serialization conversion (e.g., JavaScript Object Notation (JSON)) to perform this translation process.

Additionally or alternatively, the gateway service may provide one or more security features to the API. For example, the gateway service may request authentication from the software application prior to enabling the software application to interface with the API, thereby preventing unauthorized access of the API. As another example, the gateway service can encrypt communications of the API, such as API calls, to enable data protection and privacy. As a further example, the gateway service can include monitoring or observability capabilities such that other edge devices or other suitable computing systems can monitor the gateway service, the API, the daemon, or a combination thereof.

In some examples, more than one gateway service and more than one API may be present in the edge device or an edge computing system that includes the edge device and one or more additional edge devices. In such examples, the gateway services can be auto-scaled based on the configuration files in the database, resource consumptions of the APIs, or a combination thereof. Accordingly, the gateway services can function as an entry point between the software application and the APIs. The daemon can ensure that the gateway services maintain a one-to-one relationship with the APIs such that a single gateway service is associated with a respective API, ensuring a minimum level of process isolation for each API.

Illustrative examples are given to introduce the reader to the general subject matter discussed herein and are not intended to limit the scope of the disclosed concepts. Although certain examples are described herein with respect to an edge device, it will be appreciated that the principles described herein may also be applied to other computing environments (e.g., a distributed computing environment, cloud environment, etc.). The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of an edge computing environment 100 including a gateway service 102 generated by a daemon 104 for an application programming interface (API) 106 according to one example of the present disclosure. The edge computing environment 100 can include one or more edge devices that include limited computing resources (e.g., RAM, storage, processing power, etc.) and can process data relatively close to where the data is generated. In some examples, the edge computing environment 100 may correspond to an automotive system (e.g., a vehicle or components of the vehicle). Examples of the edge device can include a sensor, actuator, thermometer, controller, desktop computer, laptop computer, server, mobile phone, or tablet. Components within the edge computing environment 100 may be communicatively coupled via a network, such as a local area network (LAN), wide area network (WAN), the Internet, or any combination thereof.

The edge computing environment 100 can include a database 108 storing one or more configuration files 110 (e.g., service definition files). The configuration files 110 can be stored statically in the edge computing environment 100, for example in an edge operating system of the edge computing environment 100. The configuration files 110 can be human-readable text files (e.g., Yet Another Markup Language (YAML)) that can include code that can be executed to enable a selection of various features or settings.

The daemon 104 of the edge computing environment 100 can use the configuration files 110 stored in the database 108 to generate an instance 112 of the gateway service 102. For example, the daemon 104 can read a configuration file 110 to configure the gateway service 102 by adjusting settings of the instance 112 of the gateway service 102. The configuration file 110 can describe inputs that are accepted by the gateway service 102, such as a specific type of communication protocol. In some examples, the configuration file 110 can describe communication settings (message formatting, network protocol, etc.) of the API 106.

In addition to generating the gateway service 102, the daemon 104 can monitor the database 108 to detect a change to the database 108, for example an update 114 to the configuration file 110 of the configuration files 110. In some examples, the daemon 104 may periodically (e.g., every second, 5 seconds, minute, etc.) connect with the database 108 to check for updates to the configuration files 110. The update 114 to the configuration file 110 can include a different version of the configuration file 110 being uploaded to the database 108. As another example, the change to the database 108 may involve adding a different configuration file to the database 108. For example, the different configuration file may include one or more settings that apply to a specific API such that the daemon 104 can use the different configuration file to generate another gateway service for the specific API.

In an example in which the edge computing environment 100 corresponds to a home automation system, the different configuration file may be added to the database 108 when a home automation device is added to the home automation system. For example, a smart thermostat may be added to the home automation system. The database 108 may receive a specific configuration file associated with the smart thermostat that can be used to generate a corresponding gateway service that provides capabilities specific to the smart thermostat.

In some examples, the gateway service 102 can be a background process spawned by the daemon 104 such that the gateway service 102 is a subprocess of the daemon 104. The configuration file 110 can describe how and what to proxy from the API 106 and what capabilities to add to the API 106 using the gateway service 102. For example, the gateway service 102 can interface between the API 106 and a software application 116 attempting to communicate with the API 106 to perform an action 118 associated with the API 106. As an illustrative example, the software application 116 may communicate with the API 106 via the gateway service 102 to turn on a rearview camera of a vehicle in response to receiving input that the vehicle has been put into a reverse gear.

Instead of sending a request 120 (e.g., an API call) including the action 118 directly to the API 106, the software application 116 can transmit the request 120 to the gateway service 102. Once the gateway service 102 receives the request 120, the gateway service 102 can determine whether the action 118 can be performed by the API 106. If the action 118 cannot be performed by the API 106, the gateway service 102 may respond to the API 106 with an error message to indicate that the action 118 cannot be performed by the API 106.

Alternatively, if the action can be performed by the API 106, the gateway service 102 can ensure that the request 120 can be interpreted by the API 106. For example, if a request format 122 of the request 120 is compatible with an interface format 124 of the API 106, the gateway service 102 may forward the request 120 to the API 106. Alternatively, if the request format 122 is incompatible with the interface format 124, the gateway service 102 may transform the request format 122 into the interface format 124 or another suitable communication format that is compatible with the interface format 124.

In some examples, the gateway service 102 may use data serialization to transform the request 120 from the request format 122 into the interface format 124. For example, the gateway service 102 may use Javascript Object Notation (JSON) to perform a data interchange with respect to the request format 122 of the request 120. Once the request format 122 is compatible with the interface format 124, the gateway service 102 can forward the request 120 to the API 106. In response, the API 106 can interpret the request 120 to identify and perform the action 118 included in the request 120. Once the API 106 performs the action 118, the API 106 can generate a response 126 indicating that the action 118 has been performed. The API 106 can forward the response 126 to the gateway service 102 so that the gateway service 102 can transmit the response 126 received from the API 106 to the software application 116 to fulfill the request 120.

In some examples, the gateway service 102 can have a one-to-one relationship with the API 106 such that the gateway service 102 is solely associated with a single API 106 instead of multiple APIs. In examples in which more than one API 106 is present in the edge computing environment 100, the daemon 104 can auto-scale the gateway service 102 such that a respective gateway service can correspond to each API 106. Auto-scaling the gateway service 102 can maintain the one-to-one relationship between each API 106 and the respective gateway service.

Figure 2:
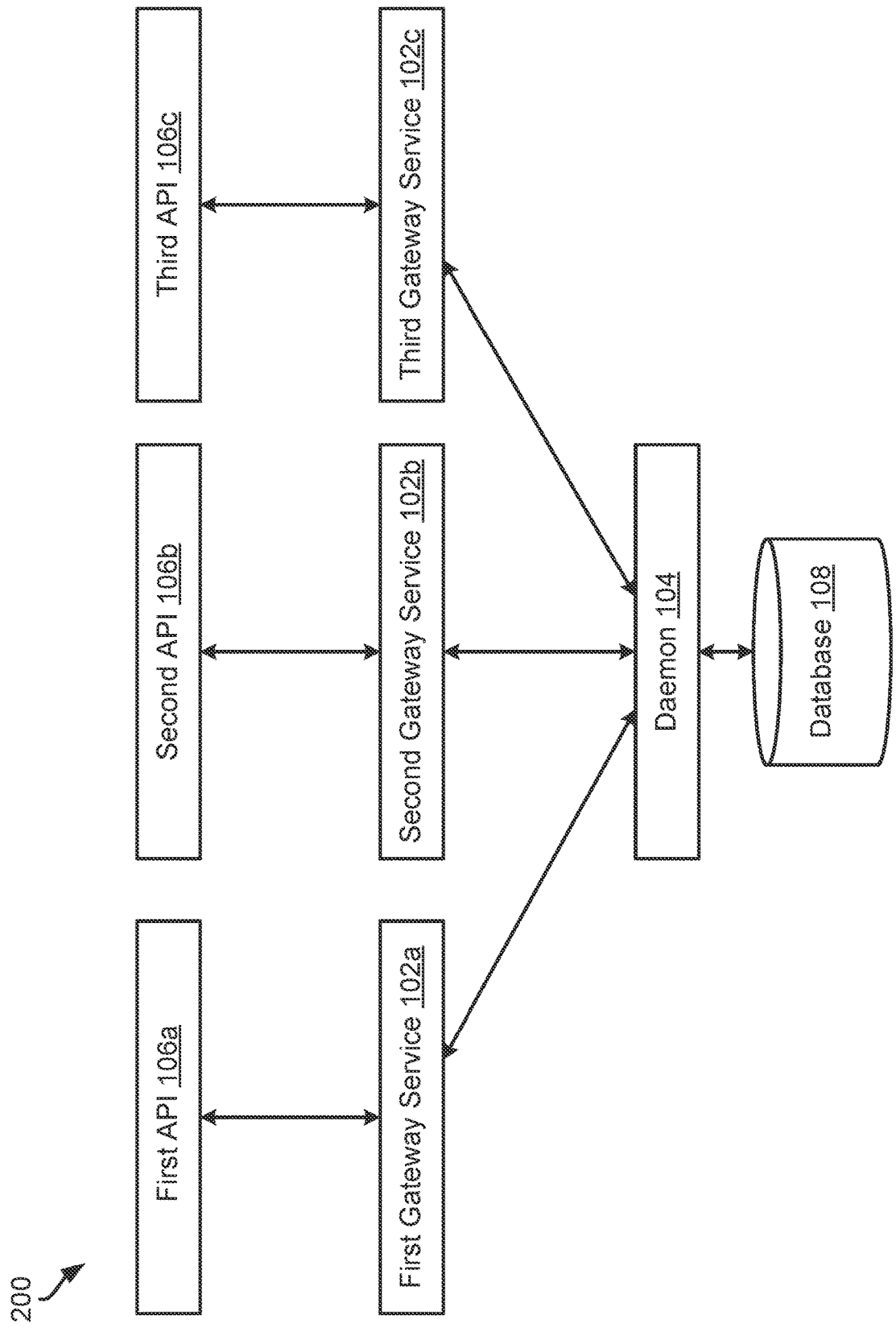
FIG. 2 is a block diagram of an example of an edge computing environment including multiple gateway services generated by a daemon for application programming interfaces (APIs) according to one example of the present disclosure.

For example, referring to the example depicted in FIG. 2 of an edge computing environment 200 that includes multiple gateway services 102a-c, the daemon 104 may generate respective gateway services that correspond to a first API 106a, a second API 106b, and a third API 106c. As depicted in FIG. 2, a first gateway service 102a can correspond solely to the first API 106a, enabling process isolation with respect to the first gateway service 102a. Similarly, a second gateway service 102b and a third gateway service 102c can be exclusively associated with the second API 106b and the third API 106c, respectively. The process isolation can contribute to a software application (e.g., the software application 116 of FIG. 1) that interacts with the APIs 106a-c obtaining a functional safety certification. For example, in an automotive environment, the functional safety certification may involve one or more automotive safety integrity levels (ASILs). The ASILs can be outlined in a safety standard such as ISO 26262 that is defined by the International Organization for Standardization (ISO).

Returning to FIG. 1, the gateway service 102 can extend the API 106 to include the capabilities described in the configuration file 110. In some examples, the gateway service 102 may expose a system library to various communication protocols, such as HTTP or message queueing telemetry transport (MQTT). Once the functions are exposed, the API 106 or other services in the edge computing environment 100 can use the functions without compiling library code of the system library. Thus, exposing the system library can avoid an additional step of compiling code to use specific functions of the system library, thereby conserving limited computing resources in the edge computing environment 100. Additionally, compiling the code can vary depending on a programming language of the system library. In contrast to compiling the code, exposing the system library can simplify an integration of the functions into the API 106, for example by implementing a language-agnostic process that is independent of the programming language used.

Additionally or alternatively, the gateway service 102 may monitor a resource consumption 128 of the API 106, for example with respect to storage or processing power of the API 106. The gateway service 102 can use the resource consumption 128 to determine whether the API 106 is in an inactive state 130, for example indicating that the API 106 has been stopped or has malfunctioned. Additionally, the gateway service 102 may perform read-only operations (e.g., health checks, inspections, etc.) associated with monitoring the API 106. In some examples, other systems can use monitoring and observability capabilities provided by the gateway service 102 to monitor the API 106, the daemon 104, the gateway service 102, or a combination thereof. In such examples, the other systems may be communicatively coupled with the edge computing environment 100.

If the gateway service 102 determines that the API 106 is in the inactive state 130, the gateway service 102 can determine a mitigation operation 132 for the API 106, for example using a rule set 134. Examples of the mitigation operation 132 can include restarting the API 106, marking the API 106 as being in the inactive state 130, initiating a self-healing process for the API 106, or other suitable measures. In some examples, the rule set 134 that can be used to determine the mitigation operation 132 may be generated at least in part by an external entity associated with the edge computing environment 100. For example, if the edge computing environment 100 corresponds to an automotive component, the external entity may be a manufacturer of the automotive component.

Additionally, based on the resource consumption 128, the gateway service 102 may determine that a specific resource consumption (e.g., a memory consumption 136) of the API 106 is above a predefined threshold 138. In some examples, the predefined threshold 138 may correspond to resource constraints associated with the edge computing environment 100. For example, the edge computing environment 100 may have a total of 5 GB of storage available, with 25% of this storage being used for critical components. Accordingly, the predefined threshold 138 may at or below 75% of the storage to prevent the memory consumption 136 of the API 106 from causing the critical components to malfunction due to a lack of storage.

In some examples, the gateway service 102 may adjust a memory allocation 140 or other suitable resource allocation of the API 106 as the mitigation operation 132 based on the resource consumption 128. For example, if the gateway service 102 determines that the memory allocation 140 with respect to the API 106 is insufficient based on the memory consumption 136, the gateway service 102 may increase the memory allocation 140. Additionally or alternatively, if other components in the edge computing environment 100 are exceeding a respective predefined threshold, the gateway service 102 may decrease the memory allocation 140 of the API 106.

In some examples, the gateway service 102 may add security features associated with the API 106. For example, the gateway service 102 can enable encryption (e.g., symmetric or asymmetric key cryptography) for communications of the API 106. As another example, the gateway service 102 can transmit an authentication request 142 to the software application 116, such as after receiving the request 120 from the software application 116. The authentication request 142 may prompt the software application 116 for credentials 144 (e.g., a certificate, token, etc.) to verify that the software application 116 is permitted to access the API 106. After receiving the authentication request 142, the software application 116 may transmit the credentials 144 to the gateway service 102 to authenticate the credentials 144. If the gateway service 102 is able to authenticate the credentials 144, the gateway service 102 may enable communication between the software application 116 and the API 106, for example by forwarding the request 120 to the API 106. Alternatively, if the gateway service 102 is unable to authenticate the credentials 144, the gateway service 102 may request further authentication from the software application 116 or outright deny the request 120 of the software application 116.

If the daemon 104 detects an update 114 to the configuration file 110, the daemon 104 can use the updated configuration file 110 to generate an updated instance 112*a* of the gateway service 102. In such examples, if an existing instance 112*b* of the gateway service 102 is present, the daemon 104 may replace the existing instance 112*b* of the gateway service 102 with the updated instance 112*a* of the gateway service 102. Prior to replacing the existing instance 112*b*, the daemon 104 may run at least one status check on the updated instance 112*a* to ensure that the updated instance 112*a* is functional and free from vulnerabilities (e.g., bugs, malware, etc.).

While FIGS. 1-2 depicts a specific arrangement of components, other examples can include more components, fewer components, different components, or a different arrangement of the components shown in FIGS. 1-2. For instance, in other examples, the API 106 may be positioned in a different edge device than an edge device that includes the daemon 104 and gateway service 102. Additionally, any component or combination of components depicted in FIGS. 1-2 can be used to implement the process(es) described herein.

Figure 3:
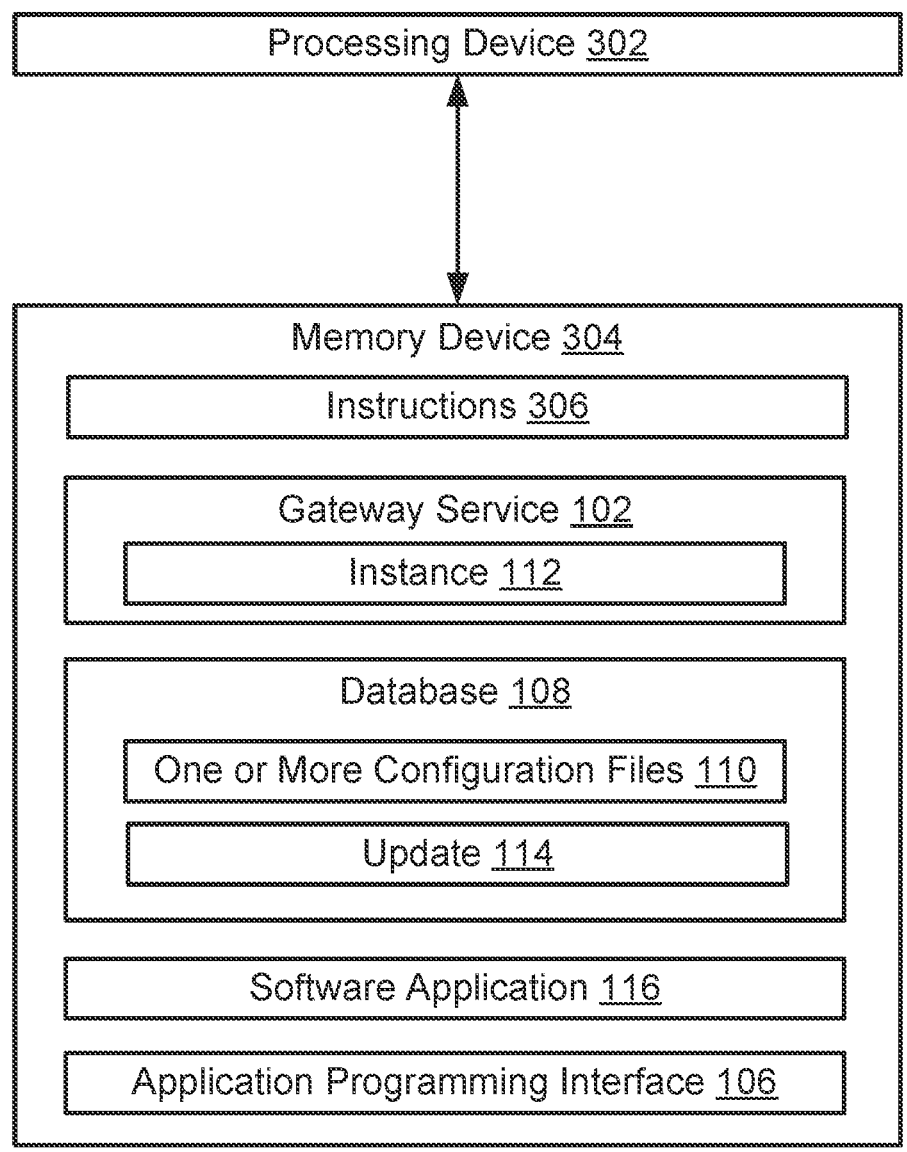
FIG. 3 is a block diagram of another example of an edge computing environment including a gateway service generated by a daemon for an API according to one example of the present disclosure.

FIG. 3 is a block diagram of another example of an edge computing environment 300 including a gateway service 102 generated by a daemon (e.g., the daemon 104 of FIGS. 1-2) for an API 106 according to one example of the present disclosure. The edge computing environment 300 can include a processing device 302 communicatively coupled to a memory device 304.

The processing device 302 can include one processing device or multiple processing devices. The processing device 302 can be referred to as a processor. Non-limiting examples of the processing device 302 include a Field-Programmable Gate Array (FPGA), an application-specific integrated circuit (ASIC), and a microprocessor. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, Java, Python, or any combination of these.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. At least some of the memory device 304 includes a non-transitory computer-readable medium from which the processing device 302 can read instructions 306. A computer-readable medium can include electronic, optical, magnetic, or other storage devices capable of providing the processing device 302 with the instructions 306 or other program code. Non-limiting examples of a computer-readable medium include magnetic disk(s), memory chip(s), ROM, random-access memory (RAM), an ASIC, a configured processor, and optical storage.

In some examples, the processing device 302 can monitor a database 108 containing a configuration file 110 that can be used to generate a gateway service 102. The configuration file 110 can include one or more configurations of the gateway service 102, for example having different capabilities provided by the gateway service 102. While monitoring the database 108, the processing device 302 may detect an update 114 to the configuration file 110. For example, the processing device 302 may detect that a different version of the configuration file 110 has been stored in the database 108. The processing device 302 can generate an instance 112 of the gateway service 102 in response to detecting the update 114 to the configuration file 110. The instance 112 of the gateway service 102 can be used to interface between a software application 116 and an API 106, for example by ensuring that communication between the software application 116 and the API 106 is feasible.

Figure 4:
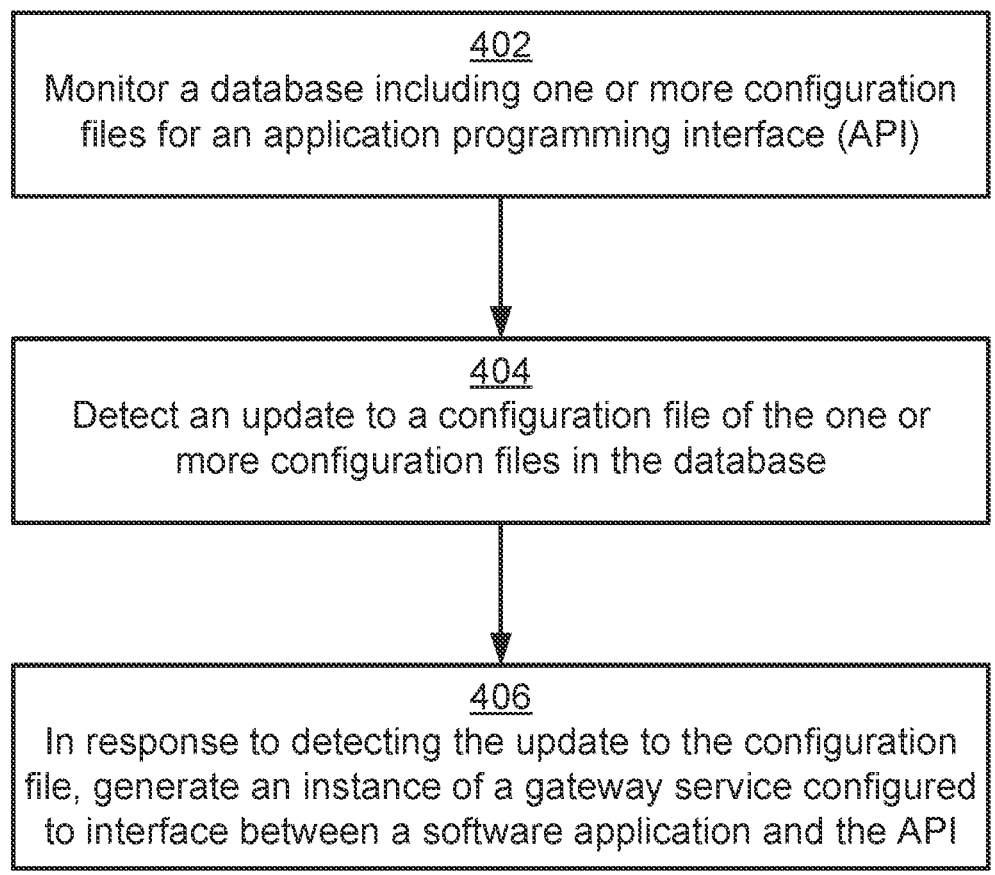
FIG. 4 is a flowchart of a process for generating an instance of a gateway service by a daemon for an API in an edge device according to one example of the present disclosure.

FIG. 4 is a flowchart of a process 400 for generating an instance 112 of a gateway service 102 by a daemon 104 for an API 106 in an edge device according to one example of the present disclosure. In some examples, the processing device 302 can perform one or more of the steps shown in FIG. 4. In other examples, the processing device 302 can implement more steps, fewer steps, different steps, or a different order of the steps depicted in FIG. 4. The steps of FIG. 4 are described below with reference to components discussed above in FIGS. 1-3.

In block 402, the processing device 302 monitors a database 108 including a configuration file 110 for the API 106. In some examples the processing device 302 may monitor the database 108 intermittently, for example based on a predetermined interval of time. Additionally or alternatively, the processing device 302 may receive a notification from the database 108 that can indicate that at least one change to the database 108 was made and can describe the at least one change.

In block 404, the processing device 302 detects an update 114 to the configuration file 110 in the database 108. In some examples, the processing device 302 may determine that the update 114 to the configuration file 110 provides a different version of the configuration file 110, for example enabling different capabilities that can be implemented by the gateway service 102. For example, the processing device 302 may detect that a YAML file stored in the database 108 has been updated to include an encryption capability to protect communications (e.g., an API call) associated with the API 106.

In block 406, in response to detecting the update 114 to the configuration file 110, the processing device 302 generates the instance 112 of the gateway service 102 configured to interface between a software application 116 and the API 106. The processing device 302 can use the instance 112 to facilitate communication between the software application 116 and the API 106 by ensuring compatible communication formats are used. In some examples, the processing device 302 can determine that a request format 122 of a request 120 generated by the software application 116 is different from an interface format 124 of the API 106. For example, a file transfer protocol (FTP) may be used as the request format 122 and can be incompatible with HTTP as the interface format 124. In response, the processing device 302 may a data serialization operation to convert the request format 122 such that the request format 122 is compatible with HTTP.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device including instructions that are executable by the processing device for causing the processing device to perform operations comprising:
monitoring a database including one or more configuration files for an application programming interface (API);
detecting an update to a configuration file of the one or more configuration files in the database; and
in response to detecting the update to the configuration file, generating an instance of a gateway service configured to interface between a software application and the API.

2. The system of claim 1, wherein generating the instance of the gateway service further comprises:
in response to detecting the update to the database, determining that the update to the configuration file is associated with updating an existing instance of the gateway service; and
replacing the existing instance of the gateway service with an updated instance of the gateway service, wherein the updated instance of the gateway service is generatable using the updated configuration file.

3. The system of claim 1, wherein the operations further comprise, by the gateway service:
receiving a request from the software application that includes an action associated with the API;
determining that the action included in the request is performable by the API;
forwarding the request to the API, the API configured to perform the action and generate a response in response to performing the action; and
transmitting a response received from the API to the software application to fulfill the request.

4. The system of claim 3, wherein the operations further comprise, by the gateway service, in response to receiving the request from the software application:
identifying a request format of the request, wherein the request format is usable to define communication of the request;
determining that the request format of the request is different than an interface format of the API; and
in response to determining that the request format is different than the interface format, translating the request from the request format to the interface format of the API.

5. The system of claim 3, wherein the operations further comprise, by the gateway service, in response to receiving the request from the software application:
transmitting an authentication request to the software application;
in response to transmitting the authentication request to the software application, receiving credentials from the software application;
authenticating the credentials received from the software application; and
in response to authenticating the credentials, forwarding the request to the API.

6. The system of claim 1, wherein the operations further comprise, by the gateway service:
monitoring a resource consumption of the API;
determining, based on the resource consumption of the API, that the API is in an inactive state; and
in response to determining that the API is in the inactive state, determining a mitigation operation for the API using a rule set.

7. The system of claim 6, wherein the operations further comprise, by the gateway service, in response to monitoring the resource consumption of the API:
determining, based on the resource consumption of the API, that a memory consumption of the API is above a predefined threshold; and
in response to determining that the memory consumption of the API is above the predefined threshold, adjusting a memory allocation of the API as the mitigation operation.

8. A method comprising:
monitoring a database including one or more configuration files for an application programming interface (API);
detecting an update to a configuration file of the one or more configuration files in the database; and
in response to detecting the update to the configuration file, generating an instance of a gateway service configured to interface between a software application and the API.

9. The method of claim 8, wherein generating the instance of the gateway service further comprises:
in response to detecting the update to the database, determining that the update to the configuration file is associated with updating an existing instance of the gateway service; and
replacing the existing instance of the gateway service with an updated instance of the gateway service, wherein the updated instance of the gateway service is generatable using the updated configuration file.

10. The method of claim 8, further comprising, by the gateway service:
receiving a request from the software application that includes an action associated with the API;
determining that the action included in the request is performable by the API;
forwarding the request to the API, the API configured to perform the action and generate a response in response to performing the action; and
transmitting a response received from the API to the software application to fulfill the request.

11. The method of claim 10, further comprising, by the gateway service, in response to receiving the request from the software application:
identifying a request format of the request, wherein the request format is usable to define communication of the request;
determining that the request format of the request is different than an interface format of the API; and
in response to determining that the request format is different than the interface format, translating the request from the request format to the interface format of the API.

12. The method of claim 10, further comprising, by the gateway service, in response to receiving the request from the software application:
transmitting an authentication request to the software application;
in response to transmitting the authentication request to the software application, receiving credentials from the software application;
authenticating the credentials received from the software application; and
in response to authenticating the credentials, forwarding the request to the API.

13. The method of claim 8, further comprising, by the gateway service:
monitoring a resource consumption of the API;
determining, based on the resource consumption of the API, that the API is in an inactive state; and
in response to determining that the API is in the inactive state, determining a mitigation operation for the API using a rule set.

14. The method of claim 13, further comprising, by the gateway service, in response to monitoring the resource consumption of the API:
determining, based on the resource consumption of the API, that a memory consumption of the API is above a predefined threshold; and
in response to determining that the memory consumption of the API is above the predefined threshold, adjusting a memory allocation of the API as the mitigation operation.

15. A non-transitory computer-readable medium comprising program code executable by a processing device for causing the processing device to perform operations comprising:
monitoring a database including one or more configuration files for an application programming interface (API);
detecting an update to a configuration file of the one or more configuration files in the database; and
in response to detecting the update to the configuration file, generating an instance of a gateway service configured to interface between a software application and the API.

16. The non-transitory computer-readable medium of claim 15, wherein generating the instance of the gateway service further comprises:
in response to detecting the update to the database, determining that the update to the configuration file is associated with updating an existing instance of the gateway service; and
replacing the existing instance of the gateway service with an updated instance of the gateway service, wherein the updated instance of the gateway service is generatable using the updated configuration file.

17. The non-transitory computer-readable medium of claim 15, wherein the operations further comprise, by the gateway service:
receiving a request from the software application that includes an action associated with the API;
determining that the action included in the request is performable by the API;
forwarding the request to the API, the API configured to perform the action and generate a response in response to performing the action; and
transmitting a response received from the API to the software application to fulfill the request.

18. The non-transitory computer-readable medium of claim 17, wherein the operations further comprise, by the gateway service, in response to receiving the request from the software application:
identifying a request format of the request, wherein the request format is usable to define communication of the request;
determining that the request format of the request is different than an interface format of the API; and
in response to determining that the request format is different than the interface format, translating the request from the request format to the interface format of the API.

19. The non-transitory computer-readable medium of claim 17, wherein the operations further comprise, by the gateway service, in response to receiving the request from the software application:
transmitting an authentication request to the software application;
in response to transmitting the authentication request to the software application, receiving credentials from the software application;
authenticating the credentials received from the software application; and
in response to authenticating the credentials, forwarding the request to the API.

20. The non-transitory computer-readable medium of claim 15, wherein the operations further comprise, by the gateway service:
monitoring a resource consumption of the API;
determining, based on the resource consumption of the API, that the API is in an inactive state; and
in response to determining that the API is in the inactive state, determining a mitigation operation for the API using a rule set.

* * * * *